United States Patent [19]
Holmberg

[11] Patent Number: 4,945,821
[45] Date of Patent: Aug. 7, 1990

[54] VENTILATED GREENHOUSE

[76] Inventor: Douglas A. Holmberg, 1321 North Valrico, Valrico, Fla. 33954

[21] Appl. No.: 230,334

[22] Filed: Aug. 9, 1988

Related U.S. Application Data

[63] Continuation of Ser. No. 410, Jan. 5, 1987, abandoned.

[51] Int. Cl.$^5$ .............................................. F24F 13/10
[52] U.S. Cl. ............................................. 98/32; 47/17
[58] Field of Search .................. 47/17; 52/2, 18, 222; 98/32, 37, 42.16, 42.17, 42.2, DIG. 6

[56] References Cited

U.S. PATENT DOCUMENTS

| | | | |
|---|---|---|---|
| 3,777,425 | 12/1973 | Le Bourgeois | 47/17 X |
| 3,791,076 | 2/1974 | Gahler | 47/17 X |
| 4,399,738 | 8/1983 | Sharkey | 98/32 |

FOREIGN PATENT DOCUMENTS

| | | | |
|---|---|---|---|
| 84944 | 5/1982 | Japan | 98/32 |
| 1250065 | 10/1971 | United Kingdom | 98/32 |

*Primary Examiner*—Harold Joyce
*Attorney, Agent, or Firm*—A. W. Fisher, III

[57] ABSTRACT

A ventilated greenhouse comprising an enclosure cooperatively formed by a first and second substantially parallel vertical side wall disposed in spaced relationship relative to each other by a pair of substantially parallel vertical end walls and a roof including a first and second roof section wherein opposite ends of the first roof section are disposed in overlapping spaced relationship relative to the upper portion of the second roof section and the upper portion of the first substantially vertical side wall to cooperatively form a ridge vent and side vent respectively and a first and second sealing element each movable between a first and second position disposed in operative relationship relative to the ridge vent and side vent respectively to permit air circulation through the ventilated greenhouse when the first and second sealing elements are in the first position and to seal the ridge vent and side vent respectively when the first and second sealing elements are in the second position.

6 Claims, 2 Drawing Sheets

VENTILATED GREENHOUSE

CROSS REFERENCE

This application is a continuation of application Ser. No. 000,410 filed Jan. 5, 1987 now abandoned.

BACKGROUND OF THE INVENTION

1. Field of the Invention

A ventilated greenhouse including a first and second sealing element to selectively seal a ridge vent and side vent respectively to control air circulation through the ventilated greenhouse.

2. Description of the Prior Art

Numerous efforts have been undertaken to provide greenhouse construction with selective venting and circulation therethrough to control humidity and temperature within the greenhouse.

It is common to ventilate a greenhouse with a ridge opening in combination with side wall openings to provide air flow using shutters or other closure means to control air flow through the greenhouse.

U.S. Pat. No. 4,399,738 discloses a greenhouse ventilation means including an elongated tubular inflatable member disposed adjacent a ridge vent extending along the ridge of the greenhouse and a side vent along extending the side wall of the greenhouse having an elongated tubular inflatable member disposed adjacent thereto such that the elongated tubular inflatable members when deflated permit circulation of air through the side vent and ridge, vent and the elongated tubular inflatable members seal the ridge and side vents when inflated.

U.S. Pat. No. 4,438,680 shows a greenhouse comprises a glazing structure and glazing bars including a ridge to support the glazing structure. The ridge includes vents opening into the enclosure defined by the glazing structure and into the ambient atmosphere. A blower exhausts air from the enclosure into the ambient atmosphere. U.S. Pat. No. 1,070,434 disclosed a greenhouse with sash bars extending from the lower edge of one side of the roof to the peak of the roof and thence to the lower edge of the other side of the roof.

U.S. Pat. No. 3,401,621 shows the venting of an interior structure by means of a blower mounted near the ridge line of the structure.

U.S. Pat. No. 3,063,191 discloses an artificially climatized greenhouse including a ridge ventilation. Similarly, U.S. Pat. No. 3,562,972 shows a greenhouse construction for environmental or climate control.

Additional examples of similar construction are shown in U.S. 2,046,600; U.S. 3,274,730; U.S. 3,874,114; U.S. 3,063,195; U.S. 4,027,437; U.S. 4,055,030; U.S. 4,141,798; U.S. 4,196,544; U 4,216,618; U.S. 4,262,656; U.S. 4,283,889; U.S. 4,301,626; U.S. 4,316,405; U.S. 4,318,251; U.S. 4,352,259; U.S. 4,366,646; U.S. 4,387,533; U.S. 4,452,230; U.S. 4,470,405; U.S. 4,505,066; U.S. 4,510,921; U.S. 4,515,150; U.S. 4,565,230; U.S. 4,567,732; and U.S. 4,569,150.

SUMMARY OF THE INVENTION

The present invention relates to a ventilated greenhouse comprising an enclosure including a ridge vent and side vent in combination with a first and second sealing element to selectively control air flow through the ridge vent and side vent respectively.

The enclosure comprises a first and second side wall, a pair of end walls and a first and second roof section.

The first and second side walls, end walls and first and second roof sections are constructed of tubular frame members having a clear membrane such as polyethylene or the like secured thereto.

The clear membrane is secured to opposite ends of the first roof section by a pair of first primary sealing-/securing means, while the clear membrane is secured to the upper portions of the second roof section and the first side wall in spaced relationship relative to the upper ends of the second roof section and the side wall by a pair of second primary sealing/securing means.

Opposite ends of the first roof section are held in overlapping, spaced relationship relative to the upper portions of the second roof section and the first side wall by a plurality interconnecting brace members.

The first and second sealing elements each comprises an elongated oblong inflatable member anchored to the enclosure by a plurality of anchor elements and a plurality of secondary sealing members disposed in triangular relationship relative to each other. Each secondary sealing member comprises an elongated sealing element extending the length of the elongated oblong inflatable members.

A blower or air pressure source is coupled to the first and second sealing elements through air feed lines to selectively inflate and deflate the first and second sealing elements to selectively control the air flow through the ventilated greenhouse.

In use, when the first and second sealing elements are deflated, air flows freely from the side vent through the enclosure and out the ridge vent.

When fully inflated, the first and second sealing elements engage the respective first and second primary sealing/securing means and the respective secondary sealing members.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature snd object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
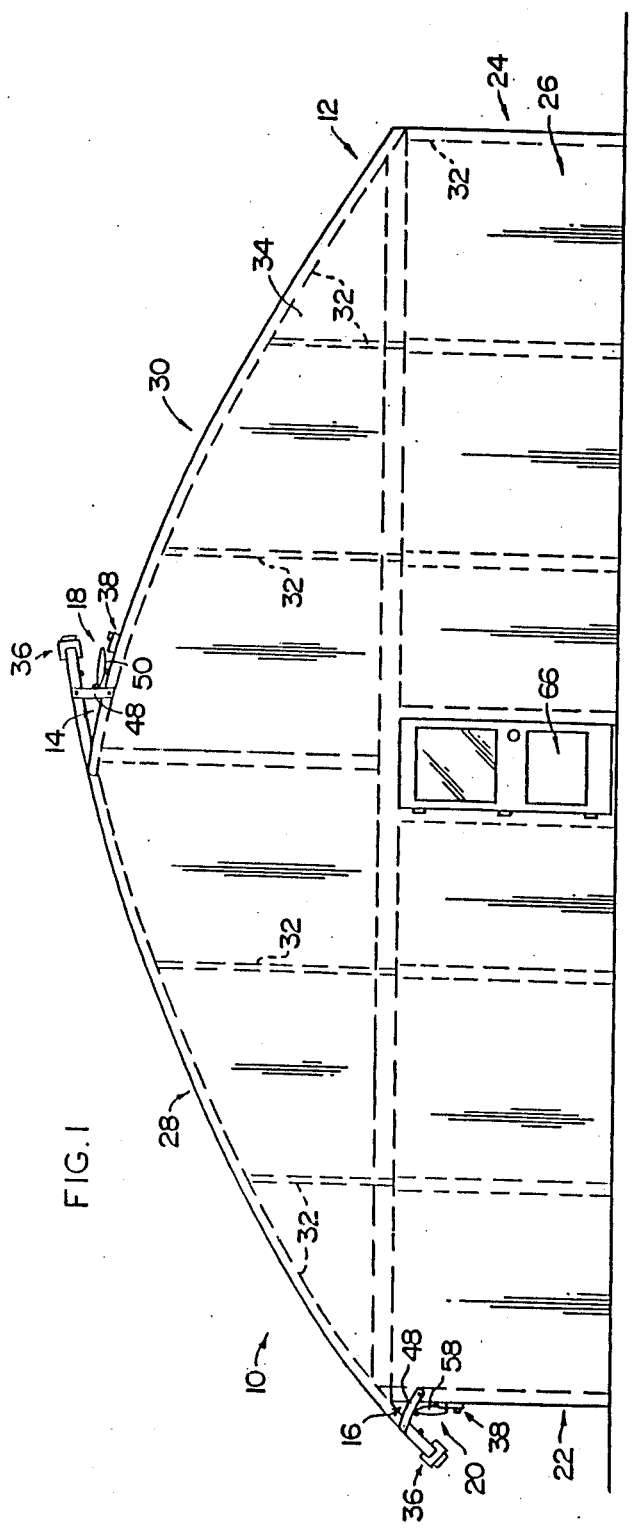
FIG. 1 is an end view of the ventilated greenhouse

As shown in FIG. 1, the present invention relates to a ventilated greenhouse generally indicated as 10 comprising an enclosure generally indicated as 12 including a ridge vent and side vent generally indicated as 14 and 16 respectively in combination with a first and second sealing element generally indicated as 18 and 20 respectively to selectively control air flow through the ridge vent 14 and side vent 16 respectively.

The enclosure 12 comprises a first and second substantially parallel vertical side wall generally indicated as 22 and 24 respectively, a pair of substantially parallel vertical end walls each generally indicated as 26 and a first and second roof section generally indicated as 28 and 30 respectively.

The first and second substantially parallel vertical side walls 22 and 24, pair of substantially parallel vertical end walls 26 and first and second roof sections 28 and 30 are constructed of tubular frame members each indicated as 32 having a clear membrane 34 such as polyethylene or the like secured thereto.

The clear membrane 34 is secured to opposite ends of the first roof section 28 by a pair of first primary/sealing securing means extending the length of the first and second sealing elements 18 and 20 each generally indicated as 36, while the clear membrane 34 is secured to the upper portions of the second roof section 30 and the first substantially parallel vertical side wall 22 in spaced relationship relative to the upper ends of the second roof section 30 and the first substantially parallel vertical side wall 22 by a pair of second primary sealing/securing means extending the length of first and second sealing elements 18 and 20 each generally indicated as 38. Each first primary sealing/securing means 36 comprises a hollow cap 40 affixed to opposite ends of the tubular frame members 32 of the first roof section 28 by a first attachment element 42 press fitting the clear membrane 34 therebetween. Each second primary sealing/securing means 38 comprises a securing plate 44 affixed to the upper portions of the second roof section 30 and the first substantially parallel vertical side wall 22 by a second attachment element 46 press fitting the clear membrane 34 therebetween. Opposite ends of the first roof section 28 are held in overlapping, spaced relationship relative to the upper portions of the second roof section 30 and the first substantially parallel vertical side wall 22 by a plurality of interconnecting brace members each indicated as 48.

The first sealing element 18 comprises a substantially horizontal elongated oblong inflatable member 50 anchored to the enclosure 12 by a plurality of anchor elements each indicated as 52 and a plurality of secondary sealing members each generally indicated as 54 disposed in triangular relationship relative to each other. Each secondary sealing member 54 comprises an elongated sealing element 56 extending the length of the substantially horizontally disposed elongated oblong inflatable member 50.

The second sealing element 20 comprises a substantially vertically disposed elongated oblong inflatable member 58 anchored to the enclosure 12 by a plurality of anchor elements each indicated as 60 and a plurality of secondary sealing members each generally indicated as 62 disposed in triangular relationship relative to each other. Each secondary sealing member 62 comprises an elongated sealing element 64 extending the length of the substantially vertically disposed elongated oblong inflatable member 58.

A door 66 is formed in one of the substantially parallel vertical end walls 26.

A blower or air pressure source (not shown) is coupled to the first and second sealing elements 18 and 20 through air feed lines 68 to control the extent or degree of inflation of the first and second sealing elements 18 and 20.

Figure 5:
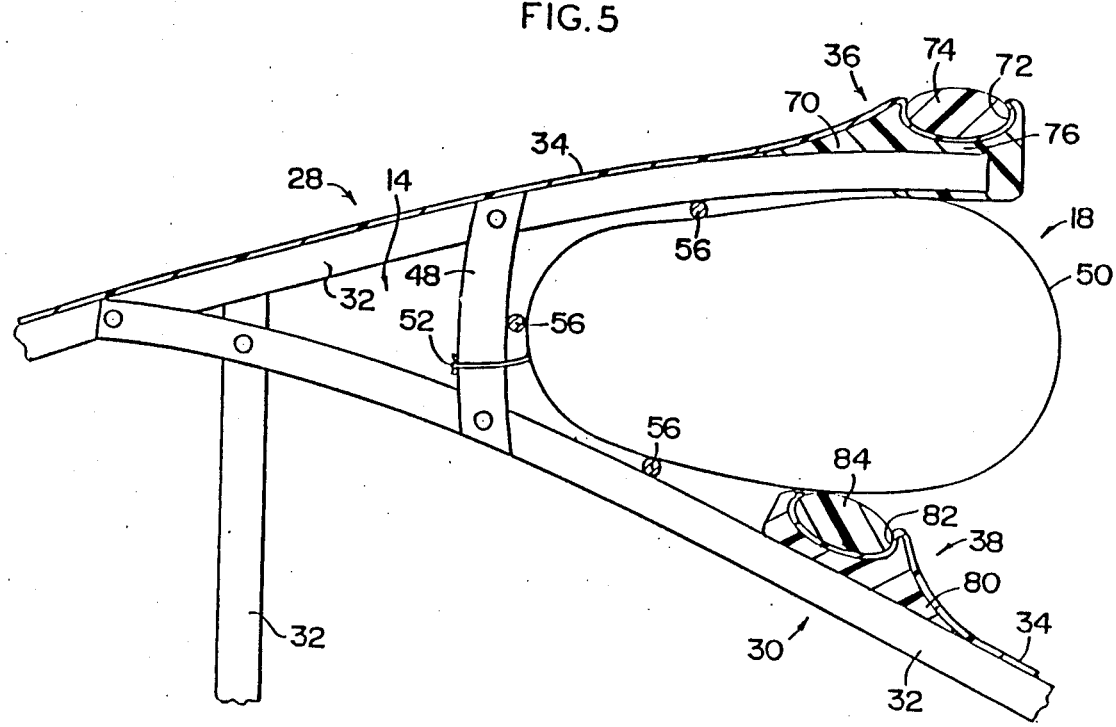
FIG. 5 is a detailed end view of an alternate first primary sealing/securing means and second primary sealing/securing means.
Figure 6:
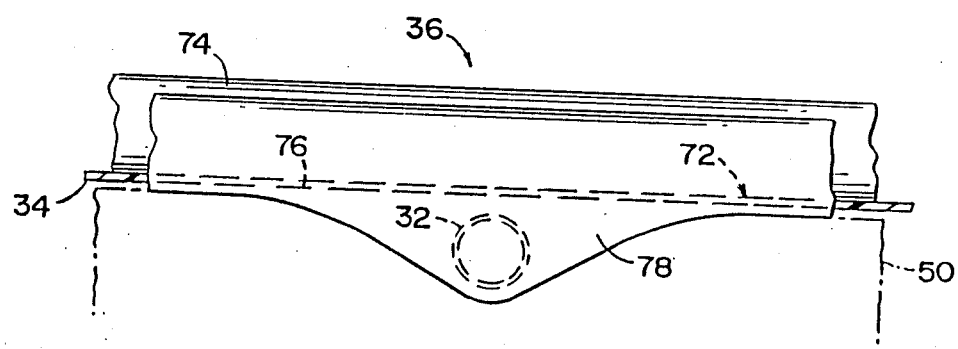
FIG. 6 is a detailed front view of the first primary sealing means of the alternate first primary sealing-/securing means.

Alternately, as shown in FIGS. 5 and 6, each first primary sealing/securing means 36 comprises a first primary securing means including an elongated flat base plate 70 having a channel or recess 72 formed the length thereof affixed to opposite ends of the tubular frame members 32 of the first roof section 28 and an elongated securing member 74 to press fit the clear membrane 34 into the channel or recess 72 in combination with a first primary sealing means including an upper substantially horizontal element 76 and a substantially V-shaped element 78 mounted on opposite ends of the tubular frame member 32 of the first roof section 28 adjacent the respective channels or recesses 72. Although the upper substantially horizontal element 76 and substantially V-shaped element 78 are shown as an integrated or unitary part, these two elements may be separate parts. The second primary sealing/securing means 38 comprises an elongated flat base plate 80 having a channel or recess 82 formed the length thereof affixed to the upper portions of the second roof section 30 and the first substantially parallel vertical side wall 22 and an elongated securing member 84 to press fit the clear membrane 34 into the channel or recess 82.

Figure 3:
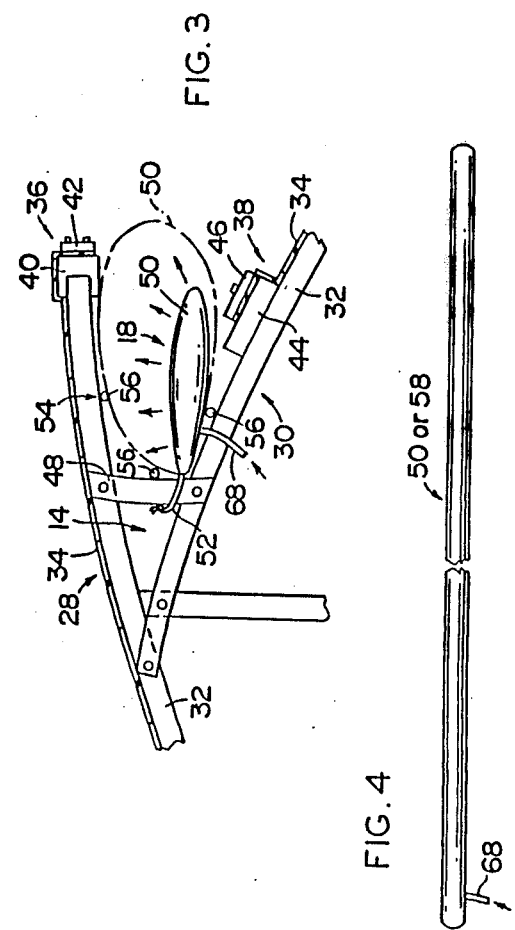
FIG. 3 is a detailed end view of the first sealing element.
Figure 4:
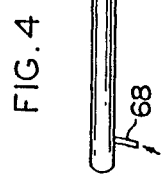
FIG. 4 is a longitudinal view of the first or second sealing element in the first or fully deflated position.
Figure 2:
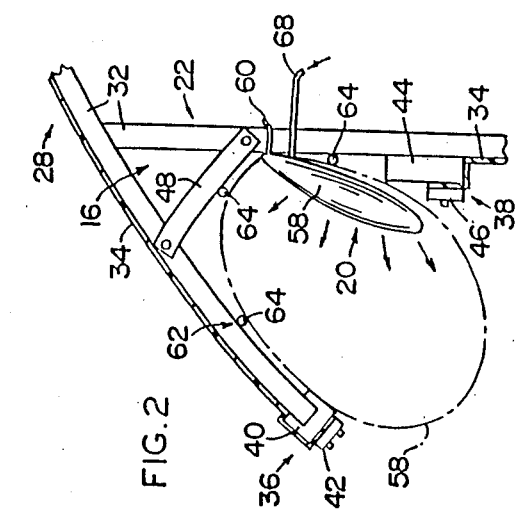
FIG. 2 is a detailed end view of the second sealing element.

In use, when the first and second sealing elements 18 and 20 are deflated as shown in FIGS. 2 and 3 in solid lines, air flows freely through the side vent 16 and enclosure 12 and out the ridge vent 14.

When fully inflated the forward portions of the first and second sealing elements 18 and 20 engage the respective first and second primary sealing/securing means 36 and 38.

In addition, the rear portions of first and second sealing elements 18 and 20 engage of the plurality of secondary sealing members 56 and 64 respectively ensuing the sealing of the first and second primary sealing/securing means 36 and 38 by forcing the first and second sealing elements 18 and 20 outwardly from the ridge vent 14 and side vent 16.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A ventilated greenhouse comprising an enclosure cooperatively formed by a first and second side wall disposed in spaced relationship relative to each other by a pair of end walls and a roof including a first and second roof section wherein opposite ends of said first roof section are disposed in overlapping spaced relationship relative to the upper portion of said second roof section and the upper portion of said first side wall respectively to cooperatively form a ridge vent and side vent respectively, a first elongated inflatable member secured to said enclosure adjacent said ridge vent having three corresponding elongated sealing elements extending substantially the length of said first elongated inflatable member and a second elongated inflatable member secured to said enclosure adjacent said side vent having three corresponding sealing elements extending substantially the length of said second elongated inflatable member, said first and second elongated inflatable members each movable between a first and second position disposed in operative relationship relative to said ridge vent and side vent respectively to permit air circulation through said ventilated greenhouse when said first and second elongated inflatable members are in said first positions and to engage said corresponding elongated sealing elements to seal said ridge vent and said side vent respectively when said first and second elongated inflatable members are in said second positions, said first and second side walls, said pair of end walls and said first and second roof sections each comprises a plurality of frame members having a membrane secured thereto, said membrane secured to opposite ends of said first roof section by a pair of first primary sealing/securing means and secured to the upper portions of said second roof section and said first side wall by a pair of second primary sealing/securing means, said pairs of first and second primary sealing/securing means disposed to engage said first and second elongated inflatable members respectively when first and second elongated inflatable members are each in said second position.

2. The ventilated greenhouse of claim 1 wherein said first primary sealing/securing means comprises a hollow cap.

3. The ventilated greenhouse of claim 2 wherein said hollow cap is affixed to said first roof section by a first attachment means press fitting said membrane to said first roof section.

4. The ventilated greenhouse of claim 3 wherein second primary sealing/securing means comprises securing plate affixed to said upper portions of said second roof section and said first side wall.

5. The ventilated greenhouse of claim 4 wherein said securing plate is affixed to said second roof section and said first side wall by a second attachment means press fitting said membrane to said second roof section and said first side wall.

6. The ventilated greenhouse of claim 1 wherein opposite ends of said first roof section are held in overlapping, spaced relationship relative to said upper portions of said second roof section and said first substantially parallel vertical side member by a plurality of interconnecting brace members to form said ridge vent and said side vent respectively.

* * * * *